US006631204B1

(12) United States Patent
Smith (10) Patent No.: US 6,631,204 B1
(45) Date of Patent: Oct. 7, 2003

(54) SIMILARITY MEASUREMENT METHOD FOR THE CLASSIFICATION OF MEDICAL IMAGES INTO PREDETERMINED CATEGORIES (75) Inventor: Yoav Smith, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/497,998

(22) Filed: Feb. 4, 2000

Related U.S. Application Data (60) Provisional application No. 60/118,782, filed on Feb. 5, 1999.

(51) Int. Cl.[7] .................................................. G06K 9/00
(52) U.S. Cl. ........................ 382/130; 128/922; 600/454
(58) Field of Search ................................. 382/130, 192, 382/224, 145, 158, 133, 305, 240, 128; 128/922; 600/476, 459, 443, 410, 300; 378/21, 54; 359/548; 356/39; 345/418; 707/7, 100; 702/182

(56) References Cited

U.S. PATENT DOCUMENTS

| 5,303,381 | A | * | 4/1994 | Yagasaki ........................ 707/7 |
| 5,710,833 | A | * | 1/1998 | Moghaddam et al. ....... 382/228 |
| 5,790,702 | A | * | 8/1998 | Yoshimura .................. 382/209 |
| 5,987,456 | A | * | 11/1999 | Ravela et al. ................. 707/5 |
| 6,064,749 | A | * | 5/2000 | Hirota et al. ................ 382/103 |
| 6,144,755 | A | * | 11/2000 | Niyogi et al. ................ 382/118 |
| 6,404,925 | B1 | * | 6/2002 | Foote et al. ................. 382/224 |
| 6,418,234 | B1 | * | 7/2002 | Whited ........................ 382/110 |
| 6,430,306 | B2 | * | 8/2002 | Slocum et al. .............. 382/118 |
| 2001/0026631 | A1 | * | 10/2001 | Slocum et al. .............. 382/115 |
| 2002/0028021 | A1 | * | 3/2002 | Foote et al. ................. 382/224 |
| 2002/0181756 | A1 | * | 12/2002 | Shibuya et al. ............. 382/145 |

* cited by examiner

Primary Examiner—Jayanti K. Patel
Assistant Examiner—Barry Choobin
(74) Attorney, Agent, or Firm—Edward Langer; Shiboleth, Yisraeli, Roberts, Zisman & Co.

(57) ABSTRACT

A similarity measurement method for the classification of medical images into predetermined categories. A small set of pre-classified images is required to employ the method. The images can be real world images acquired using a camera, computer tomography, etc., or schematic drawings representing samples of different classes. The use of schematic drawings as a source of images allows a quick test of the method for a particular classification problem. The eigenvectors for each category are mathematically derived, and each image in each category is represented as a weighted linear combination of the eigenvectors. A test image is provided and projected onto the eigenvectors of each of the categories so as to reconstruct the test image with the eigenvectors. The RMS (root-mean-square) distance between the test image and each of the categories is measured. The smallest similarity measurement distance is selected, and the test image is classified in accordance with the selected smallest similarity measurement distance.

20 Claims, 13 Drawing Sheets

TABLE 1
SET OF MICROSCOPIC SLIDES:RMS DISTANCE BETWEEN IMAGE
RECONSTRUCTED FROM EACH GROUP'S EIGENVECTORS AND ORIGINAL IMAGE

| DISTANCE FROM | IMAGE 1 | IMAGE 2 | IMAGE 3 | IMAGE 4 | IMAGE 5 | IMAGE 6 | IMAGE 7 | IMAGE 8 | IMAGE 9 |
|---|---|---|---|---|---|---|---|---|---|
| | | | | IMAGES OF GROUP 1 | | | | | |
| GROUP 1 | 1.9267 | 2.0597 | 2.1761 | 2.0119 | 1.9556 | 2.0912 | 1.9274 | 2.0705 | 2.0922 |
| GROUP 2 | 2.2894 | 2.1669 | 2.5184 | 2.2446 | 2.3556 | 2.4697 | 2.3079 | 2.283 | 2.4546 |
| GROUP 3 | 2.7708 | 2.4686 | 3.0968 | 2.7248 | 2.983 | 3.0659 | 2.7582 | 2.7384 | 2.977 |
| GROUP 4 | 2.6732 | 2.4198 | 2.7658 | 2.4608 | 2.5969 | 2.7298 | 2.5084 | 2.7295 | 2.6832 |
| | | | | IMAGES OF GROUP 2 | | | | | |
| GROUP 1 | 2.2111 | 2.4787 | 2.7623 | 2.7623 | 2.1992 | 2.1647a | 2.2347 | 2.0181 | 2.65 |
| GROUP 2 | 1.8296 | 2.1668 | 0.1901 | 0.1901 | 1.8391 | 2.2217 | 1.9833 | 1.8442 | 2.1944 |
| GROUP 3 | 2.3486 | 2.46 | 2.2401 | 2.2401 | 2.3211 | 2.7565 | 2.3332 | 2.214 | 2.3989 |
| GROUP 4 | 2.3786 | 2.4342 | 2.3559 | 2.3559 | 2.3902 | 2.7292 | 2.4517 | 2.2152 | 2.2467 |
| | | | | IMAGES OF GROUP 3 | | | | | |
| GROUP 1 | 3.2299 | 2.5877 | 2.6221 | 3.2712 | 3.4882 | 2.9036 | 3.1009 | 3.223 | 2.3514 |
| GROUP 2 | 2.7434 | 2.1784 | 2.1399 | 2.6729 | 2.8944 | 2.3919 | 2.5677 | 2.645 | 2.1403 |
| GROUP 3 | 2.4005 | 2.0192 | 1.9618 | 2.2119 | 2.235 | 1.906 | 2.0677 | 2.1392 | 2.0259 |
| GROUP 4 | 2.7583 | 2.2159 | 2.2485 | 2.5386 | 2.6818 | 2.326 | 2.5474 | 2.7038 | 2.3028 |
| | | | | IMAGES OF GROUP 4 | | | | | |
| GROUP 1 | 2.8291 | 2.8642 | 2.7371 | 2.5446 | 2.7706 | 2.6103 | 2.2445 | 3.2982 | 2.4026 |
| GROUP 2 | 2.5174 | 2.5356 | 2.4258 | 2.3418 | 2.5193 | 2.2976 | 2.248 | 2.633 | 2.3302 |
| GROUP 3 | 2.493 | 2.5951 | 2.4739 | 2.2749 | 2.5323 | 2.4005 | 2.4324 | 2.3085 | 2.4647 |
| GROUP 4 | 2.1539 | 2.0288 | 1.9581 | 1.9743 | 2.0183 | 2.0223 | 2.0373 | 2.2229 | 2.0607 |

NOTE. TABLE UNITS ARE X0.00I. THE SMALLEST VALUES APPEAR IN BOLDFACE.
a ERROR: THE LOWEST VALUE SHOULD BE IN THE NEXT ROW.

SIMILARITY MEASUREMENT FOR CLASSIFICATION

TABLE 2A

SET OF HAND-DRAWN SCHEMATICS: RMS DISTANCE BETWEEN IMAGE RECONSTRUCTED FROM EACH GROUP'S EIGENVECTORS AND ORIGINAL IMAGE

| DISTANCE FROM | IMAGE 1 | IMAGE 2 | IMAGE 3 | IMAGE 4 | IMAGE 5 | IMAGE 6 | IMAGE 7 | IMAGE 8 | IMAGE 9 |
|---|---|---|---|---|---|---|---|---|---|
| | | | | IMAGES OF GROUP 1 | | | | | |
| GROUP 1 | 2.0237 | 1.8417 | 1.9275 | 2.0129 | 1.876 | 2.0365 | 0.4014 | 0.0068 | 0.0091 |
| GROUP 2 | 2.0449 | 2.1006 | 1.9988[a] | 2.006 | 2.1959 | 2.0369 | 1.9711 | 1.9711 | 2.066 |
| GROUP 3 | 2.1745 | 2.17 | 2.0379 | 2.3595 | 2.1609 | 2.3059 | 2.227 | 2.227 | 2.1935 |
| GROUP 4 | 2.1765 | 2.1191 | 2.0484 | 2.2864 | 2.1625 | 2.2736 | 2.2541 | 2.2541 | 2.1895 |
| GROUP 5 | 2.2339 | 2.3405 | 2.2448 | 2.5146 | 2.287 | 2.4688 | 2.4679 | 2.4679 | 2.291 |
| | | | | IMAGES OF GROUP 2 | | | | | |
| GROUP 1 | 2.2025 | 2.1527 | 2.3702 | 1.9972 | 2.1238 | 2.1238 | 1.9132 | 2.0602 | 2.2705 |
| GROUP 2 | 1.7659 | 2.0545 | 2.3108 | 1.7864 | 0.0062 | 0.0062 | 2.1859 | 1.9388 | 1.9927 |
| GROUP 3 | 2.3648 | 2.6758 | 2.7653 | 2.2577 | 2.2198 | 2.2198 | 1.8557[a] | 2.3319 | 2.58 |
| GROUP 4 | 2.3845 | 2.5012 | 2.6235 | 2.1909 | 2.259 | 2.259 | 1.9622 | 2.2624 | 2.5672 |
| GROUP 5 | 2.7448 | 3.0333 | 3.1082 | 2.328 | 2.6294 | 2.6294 | 1.9681 | 2.6988 | 2.9032 |
| | | | | IMAGES OF GROUP 3 | | | | | |
| GROUP 1 | 2.1481 | 2.4759 | 2.4049 | 2.5305 | 2.291 | 2.3513 | 2.0948 | 2.0015 | 2.4194 |
| GROUP 2 | 2.0981 | 2.4869 | 2.1557[a] | 2.8117 | 2.4608 | 2.585 | 2.1819 | 2.116 | 2.5971 |
| GROUP 3 | 1.867 | 1.8842 | 2.2617 | 1.984 | 1.8303 | 2.0359 | 1.7594 | 1.8715 | 1.907 |
| GROUP 4 | 2.0137 | 2.0799 | 2.1902 | 2.0386 | 1.9872 | 2.049 | 1.8998 | 1.8906 | 2.0966 |
| GROUP 5 | 2.1712 | 2.1648 | 2.5069 | 2.002 | 1.9974 | 2.0548 | 2.0731 | 2.0831 | 2.1043 |

NOTE. TABLE UNITS ARE X0.00l. THE LOWEST NUMBERS ARE TYPED IN BOLDFACE.
[a] ERROR: THE LOWEST VALUE SHOULD BE IN THE NEXT ROW.

SIMILARITY MEASUREMENT FOR CLASSIFICATION
TABLE 2B
SET OF HAND-DRAWN SCHEMATICS: RMS DISTANCE BETWEEN IMAGE
RECONSTRUCTED FROM EACH GROUP'S EIGENVECTORS AND ORIGINAL IMAGE

| DISTANCE FROM | IMAGE 1 | IMAGE 2 | IMAGE 3 | IMAGE 4 | IMAGE 5 | IMAGE 6 | IMAGE 7 | IMAGE 8 | IMAGE 9 |
|---|---|---|---|---|---|---|---|---|---|
| GROUP 1 | 2.1296 | 2.3685 | 2.2215 | 2.0685 | 2.2011 | 2.0027 | 2.3065 | 2.2139 | 2.8363 |
| GROUP 2 | 2.1555 | 2.5684 | 2.3055 | 2.0914 | 2.428  | 2.0486 | 2.2693 | 2.3235 | 2.5921 |
| GROUP 3 | 2.0601 | 2.1061 | 1.9821 | 1.8131 | 1.837  | 1.7736 | 1.8594[a] | 2.1206 | 2.7637 |
| GROUP 4 | 1.8664 | 2.0603 | 1.7857 | 1.7311 | 1.8085 | 1.7197 | 2.0127 | 1.9835 | 2.4505 |
| GROUP 5 | 2.1527 | 2.1417 | 2.0545 | 2.0237 | 1.8962 | 1.9848 | 2.0404 | 2.2281 | 3.0198 |
| GROUP 1 | 2.7117 | 2.339  | 2.9764 | 2.5328 | 2.1671 | 2.3869 | 2.9674 | 2.4173 | 2.0826 |
| GROUP 2 | 3.0363 | 2.4003 | 3.3944 | 2.7559 | 2.3961 | 2.448  | 3.1885 | 2.5435 | 2.1085 |
| GROUP 3 | 2.1861 | 2.1975 | 2.4929 | 2.1195 | 2.0157 | 1.9779 | 2.3457 | 2.0496 | 2.0467 |
| GROUP 4 | 2.3528 | 2.1215 | 2.7172 | 2.2777 | 2.0136 | 2.0093 | 2.4612 | 2.0502 | 1.8604 |
| GROUP 5 | 2.0402 | 1.8958 | 2.2077 | 1.8156 | 1.4108 | 1.9454 | 2.0898 | 1.5528 | 1.7913 |

NOTE. TABLE UNITS ARE X0.001. THE LOWEST NUMBERS ARE TYPED IN BOLDFACE.
[a] ERROR: THE LOWEST VALUE SHOULD BE IN THE NEXT ROW.

TABLE 3
TESTS ON VARIATIONS OF THE METHOD

| | FULL FOURIER TRANSFORM | ZERO CENTRAL COMPONENT OF FOURIER TRANSFORM | USING FIRST FIVE EIGENVECTORS | USING FIRST THREE EIGENVECTORS |
|---|---|---|---|---|
| GROUP 1 | 0.509525926 | 0.56692963  | 0.593240741 | 0.567059259 |
| GROUP 2 | 0.730407407 | 0.778222222 | 0.55852963  | 0.580244444 |
| GROUP 3 | 0.484859259 | 0.539755556 | 0.537366667 | 0.544022222 |
| GROUP 4 | 0.419185185 | 0.4702      | 0.466448148 | 0.468881481 |

NOTE. QUALITY MEASURED AS AVERAGE DISTANCE OF EACH GROUP FROM THE OTHER THREE GROUPS. LARGER NUMBERS INDICATE BETTER CLASSIFICATION. TABLE UNITS ARE X0.001.

TABLE 4

RMS DISTANCE BETWEEN IMAGE RECONSTRUCTED FROM EACH GROUP'S
EIGENVECTORS AND ORIGINAL IMAGE (PERFORMED ON TEST SET OF 20 IMAGES)

| DISTANCE FROM | IMAGE 1 | IMAGE 2 | IMAGE 3 | IMAGE 4 | IMAGE 5 |
|---|---|---|---|---|---|
| | IMAGES OF GROUP 1 | | | | |
| GROUP 1 | 1.9216 | 1.9306 | 1.9692 | 1.8133 | 1.8874 |
| GROUP 2 | 2.1524 | 2.1772 | 2.1987 | 2.0563 | 2.2168 |
| GROUP 3 | 2.7453 | 2.8535 | 2.8997 | 2.7434 | 2.9025 |
| GROUP 4 | 2.4931 | 2.6072 | 2.5224 | 2.4037 | 2.5323 |
| | IMAGES OF GROUP 2 | | | | |
| GROUP 1 | 2.2386 | 2.0681[a] | 2.0711[a] | 2.0835 | 1.8732 |
| GROUP 2 | 2.1046 | 2.1936 | 2.0919 | 2.0756 | 1.8717 |
| GROUP 3 | 2.2326 | 2.2653 | 2.2849 | 2.2584 | 2.3284 |
| GROUP 4 | 2.3288 | 2.3839 | 2.3472 | 2.2884 | 2.2860 |
| | IMAGES OF GROUP 3 | | | | |
| GROUP 1 | 4.8917 | 7.3918 | 6.7631 | 7.9383 | 8.2405 |
| GROUP 2 | 3.5993 | 5.5868 | 5.2756 | 6.0836 | 6.1524 |
| GROUP 3 | 2.6612 | 4.0901 | 3.6914 | 4.2620 | 4.4137 |
| GROUP 4 | 3.1537 | 5.3096 | 4.8988 | 5.6616 | 5.4796 |
| | IMAGES OF GROUP 4 | | | | |
| GROUP 1 | 2.6152 | 2.4153 | 2.6005 | 2.5491 | 2.5234 |
| GROUP 2 | 2.5363 | 2.3938 | 2.5138 | 2.3987 | 2.4773 |
| GROUP 3 | 2.7571 | 2.5899 | 2.6990 | 2.6268 | 2.6940 |
| GROUP 4 | 2.1013 | 1.9107 | 1.9777 | 1.9684 | 2.0227 |

NOTE. TABLE UNITS ARE X0.001. THE SMALLEST VALUES ARE TYPED IN BOLDFACE.
[a] ERROR: THE LOWEST VALUE SHOULD BE IN THE NEXT ROW.

TABLE 5

MEAN SCORE IN EACH PATHOLOGY
(SCORING 1=PRESENT, 0=ABSENT).

|   | ATYPICAL NEVI | MELANOMA | NEVUS |
|---|---|---|---|
| A | 0.78 | 0.57 | 0.22 |
| B | 0.81 | 0.57 | 0.23 |
| C | 0.96 | 0.64 | 0.34 |
| D | 0.81 | 0.9 | 0.36 |

TABLE 6

MEAN OF THE NUMBER OF PRESENT CRITERIA IN EVERY GROUP
(SCORING=1) FOR EVERY FEATURE THAT'S PRESENT, 0 OTHERWISE)

|   | COMMON MELANOCYTIC NEVUS | MELANOMA | ATYPICAL NEVUS |
|---|---|---|---|
| SCORE | 1.23 | 3.61 | 3.53 |

TABLE 7

SENSITIVITY AND SPECIFICITY AS A FUNCTION
OF THE NUMBER OF PRESENT CRITERIA

|   | SENSITIVITY(%) | SPECIFICITY(%) |
|---|---|---|
| AT LEAST 1 FEATURES | 97.3 | 36 |
| AT LEAST 2 FEATURES | 89.3 | 65.3 |
| AT LEAST 3 FEATURES | 65.5 | 80 |
| AT LEAST 4 FEATURES | 54 | 93.5 |

SIMILARITY MEASUREMENT METHOD FOR THE CLASSIFICATION OF MEDICAL IMAGES INTO PREDETERMINED CATEGORIES

This application claims benefit of application Ser. No. 60/118,782 filed Feb. 5, 1999.

FIELD OF THE INVENTION

The present invention relates to medical diagnostic methods and classification of medical images for this purpose, and more particularly, to a similarity measurement method employing an algorithm for the classification of medical images into predetermined categories.

BACKGROUND OF THE INVENTION

Numerous systems of grading of different pathologies have existed to guide medical personnel in diagnoses. Physicians and especially dermatologists have used the ABCD checklist for detecting cutaneous melanoma. The Gleason method of histologic grading is used for evaluating prostatic cancer. Many other pathological changes in tissues such as in breast, colon, uterus and others could benefit from a screening method for diagnosing borderline malignancies. Current advances in imaging processes have brought the computer more and more commonly into medical offices. Now imaging can be useful for diagnosis of skin irregularities, for examining tissue samples and for screening for many other medical conditions.

There are many advanced methods used today that attempt to classify sets of images into predefined groups. These methods are usually based on the following:
1) Selecting a set of features (area, perimeter, diameter, etc.).
2) Extracting those features from the given sets of images.
3) Assigning weights to the individual features which would result in the ability to classify the images with a degree of exactitude similar to that achieved by an expert's mind These methods, however, have many shortcomings. For example, there is uncertainty regarding the selection of the best features actually needed to do the classification. Also, despite the performance of an impressive succession of iterative algorithms (such as back-propagation, neural-networks or others), there remains a lack of true understanding as to why the different weights were assigned a particular value in relation to the classification task. These methods seek to replace the complicated classification process of an expert so as to deliver results that are equivalent to the outcome of the thinking process. However, medical phenomena do not always appear to fall neatly into groupings. A physician who sees many cases of a certain type of pathology will learn to adjust the definition of a grouping based on the variations that he has seen.

Thus, it would be desirable to provide a similarity measurement method for the classification of medical images into predetermined categories that would aid the physician in formulating a diagnosis.

SUMMARY OF THE INVENTION

Accordingly, it is a principal object of the present invention to provide a similarity measurement method for the classification of medical images into predetermined categories.

The similarity method of the present invention takes a different approach than the prior art approaches. It accepts that in all methods the experts have the final say, and lets them create sets of classified groups. When this is done, an efficient method is found to measure similarity between the image that is in need of classification and each of the given sets.

The method first determines which features most effectively describe each image set. The standard linear method for extracting such information about a set of images is known as the Karhunen-Loe've Transform (KLT). This transform uses the eigenvectors of the covariance matrix of the set of images, i.e. it uses the principal components of the distribution of images. The eigenvectors describe the variation from the prototype (average) image of the set. These eigenvectors together characterize all of the variations between images of the set and the prototype. Each new image can now be projected to every one of the sets using their eigenvectors, and the distance from each set's prototype can indicate the amount of similarity to the set. The method uses the smallest distance to classify the image and its value to indicate the quality of that classification.

The philosophy behind the method of the present invention is as follows. One skilled in the art can perform the initial task of classifying a broad set of images into libraries of groups. Once this is accomplished, special expertise is not needed, as similarity RMS_ERROR methods can be used to continue the classifications. With time and cooperation, these libraries can expand (assuming that an agreement can be reached on acceptability criteria such as RMS_ERROR value) thus enhancing the classification potential. In the case of Gleason grading of prostatic cancer, for example, a slide could be divided into a number of areas, each classified using the method, and color-coded accordingly. This would result in a clear graphic presentation of the overall Gleason grade.

Using the method of the present invention, digital image libraries can be built per each histopathological classification. Then each screened image will be converted to a digital media and a computer will measure the similarity distance to each pre-classified set in the library. The shortest distance, assuming it's acceptably small, will provide the diagnostics.

The time required to grade a microscopic slide by a pathologist varies, depending on his experience, between 5 and 20 min. The computer implementation time of the method of the present invention is negligible in comparison. The rate determining step of the overall time performance will be the moving of the microscope stage during scanning. Thus the method of the present invention will reduce the time needed for reviewing large numbers of slides.

It will be apparent to those skilled in the art that the method of the present invention may be applied to a variety of medical images including tissue samples, CT scans, PET scans, osteoporosis screening, thallium imaging, various cardiological tests, and surgical applications, by way of example.

Other features and advantages of the invention will become apparent from the following drawings and descriptions.

BRIEF DESCRIPTION OF THE DRAWINGS

For a better understanding of the invention with regard to the embodiments thereof reference is made to the accompanying drawings, in which like numerals designate corresponding elements or sections throughout and in which.

Table 1 shows RMS distance between the image reconstructed from each group's eigenvectors and the original image for the set of microscopic slides.

Tables 2A–B show RMS distance between the image reconstructed from each group's eigenvectors and the original image for the set of hand-drawn schematics; and Table 3 shows tests on variations of the method of the present invention.

Table 4 shows RMS distance between the image reconstructed from each group's eigenvectors and the original image performed on a test set of 20 images.

Table 5 shows the mean score in each of the ABCD pathologies.

Table 6 shows the mean of the number of present criteria in every group; and

Table 7 shows sensitivity and specificity as a function of the number of present criteria.

DETAILED DESCRIPTION OF A PREFERRED EMBODIMENT

Figure 1:
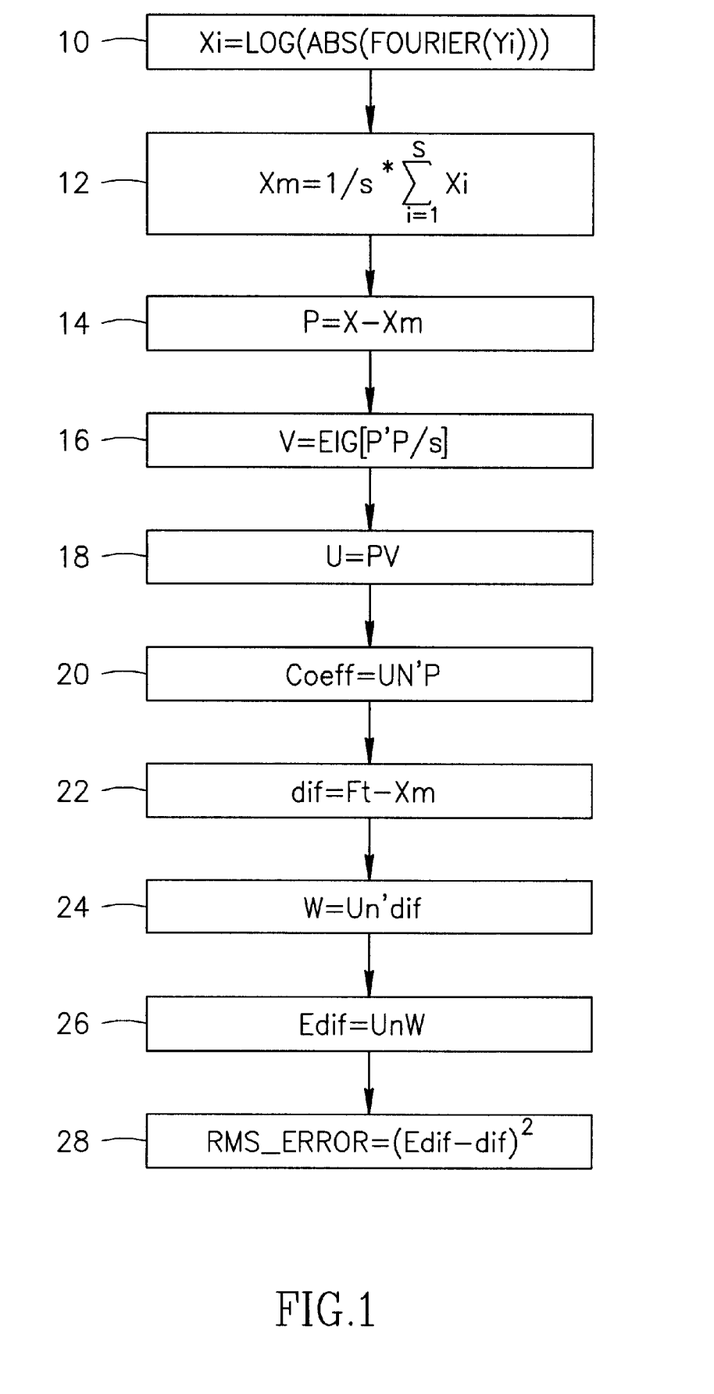
FIG. 1 is a flowchart showing an algorithm based on a mathematical classification model for use in applying the method of the present invention.

Referring now to FIG. 1, there is shown a flow chart of an algorithm based on a mathematical classification model enabling implementation of the inventive method. All images are assumed to be preclassified into j groups. Each group has s images. All images are m by m gray-level pixels. A new image t is presented and must be assigned to one of the j groups.

In each one of the j groups the following steps are performed:

In block 10 each one of the s images is indexed to Yi(i=1 . . . s) and all Yi(i=1 . . . s) images are Fourier transformed and center shifted. Each Xi [m by m] image is converted to Xi [$m^2$ by 1] column. In block 12, the average image is calculated.

In block 14, the s, Xi columns are grouped into a new matrix X=[$m^2$, s]. X is created by grouping the s images (converted into columns) into one matrix. The difference is created from average matrix P.

Eigenvectors V and eigenvalues of the covariance matrix [P' P]/s are calculated in block 16. If P is of size [$m^2$, s] then P' is of size [s, $m^2$]. V is an s by s matrix. The columns in V are reordered according to descending order of the matching eigenvalues. Notice how the size of the matrix is reduced to [s by s].

In block 18 the reordered V is used to obtain the actual eigenvectors U of the space described by P. U is of the same dimension as X. Un (n=1 . . . s) is a column of U. Its dimension is [$m^2$ by 1]. These components are used to construct the space described by P. Un (n=1 . . . s) can be displayed as an [m by m] image—an eigenimage. With the appropriate coefficients we can reconstruct P with the eigenimages.

In block 20, the coefficient matrix is obtained. The coefficient matrix is the weights assigned to the eigenvectors in t in order to reconstruct P. The small n in the equation in block 20 means P can be reconstructed using n<=s vectors.

In block 22 the image t is taken and Fourier transformed and center shifted to obtain Ft. dif is defined as the difference between Ft and the average image of the group.

In block 24 n eigenvectors Un are used to calculate the weights W, which are used to reconstruct dif. W is [n by 1].

The estimated dif—>Edif is reconstructed in the projected eigenvector space of the group in block 26.

In block 28, t is classified as belonging to the group with minimal RMS_ERROR

Figure 2:
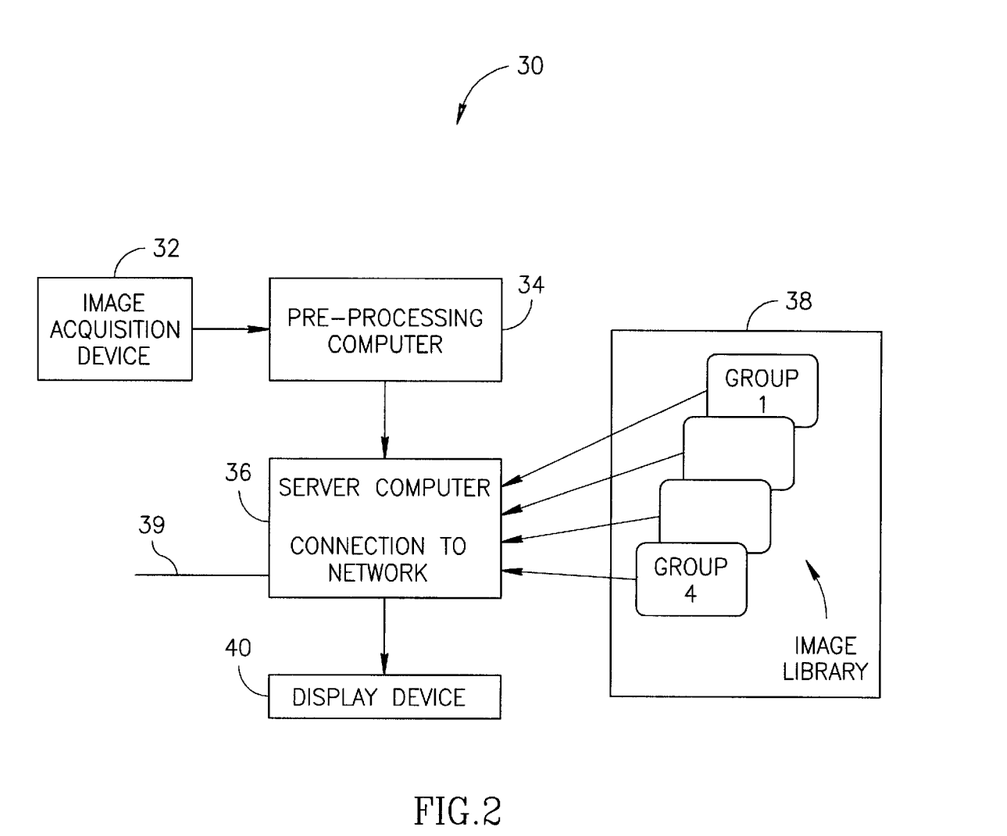
FIG. 2 is a hardware block diagram of a system for implementation of the inventive method.
Figure 3:
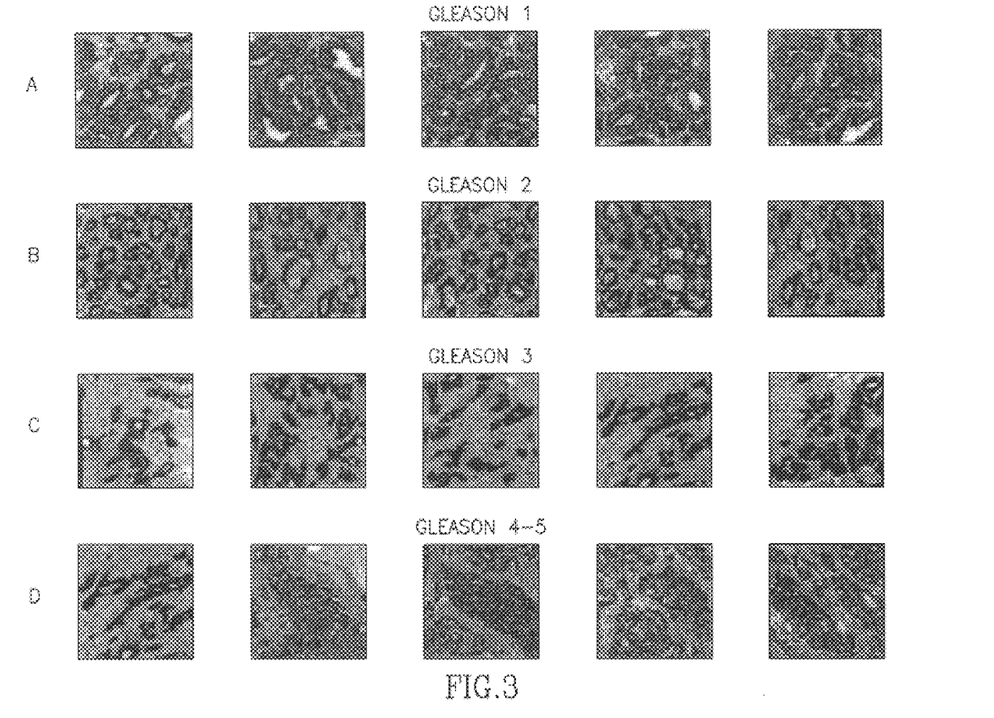
FIGS. 3a–d are photographs of stained sections representing cancerous prostates from different severity levels, respectively, Gleason Grade 1, Gleason Grade 2, Gleason Grade 3 and Gleason Grades 4 and 5.
Figure 4:
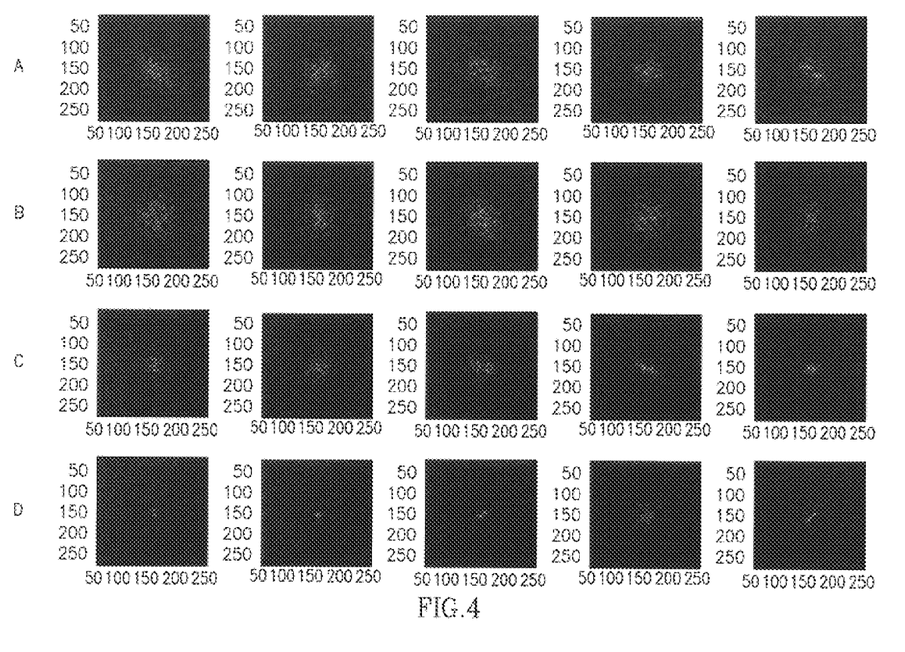
FIGS. 4a–d are Fourier transforms of the images in FIGS. 2a–d.
Figure 5:
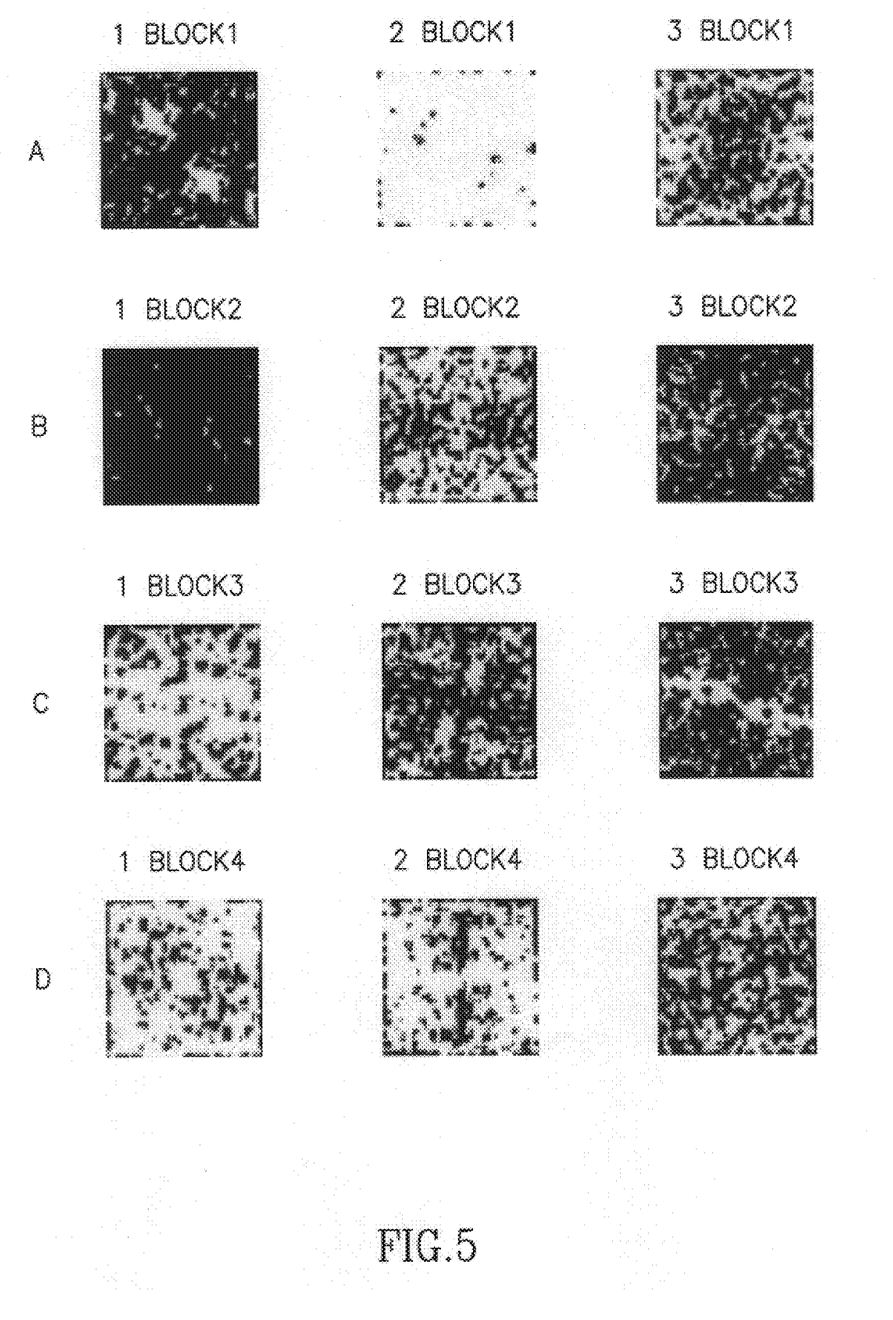
FIGS. 5a–d are the first three eigenimages of each Gleason Grade.
Figure 6:
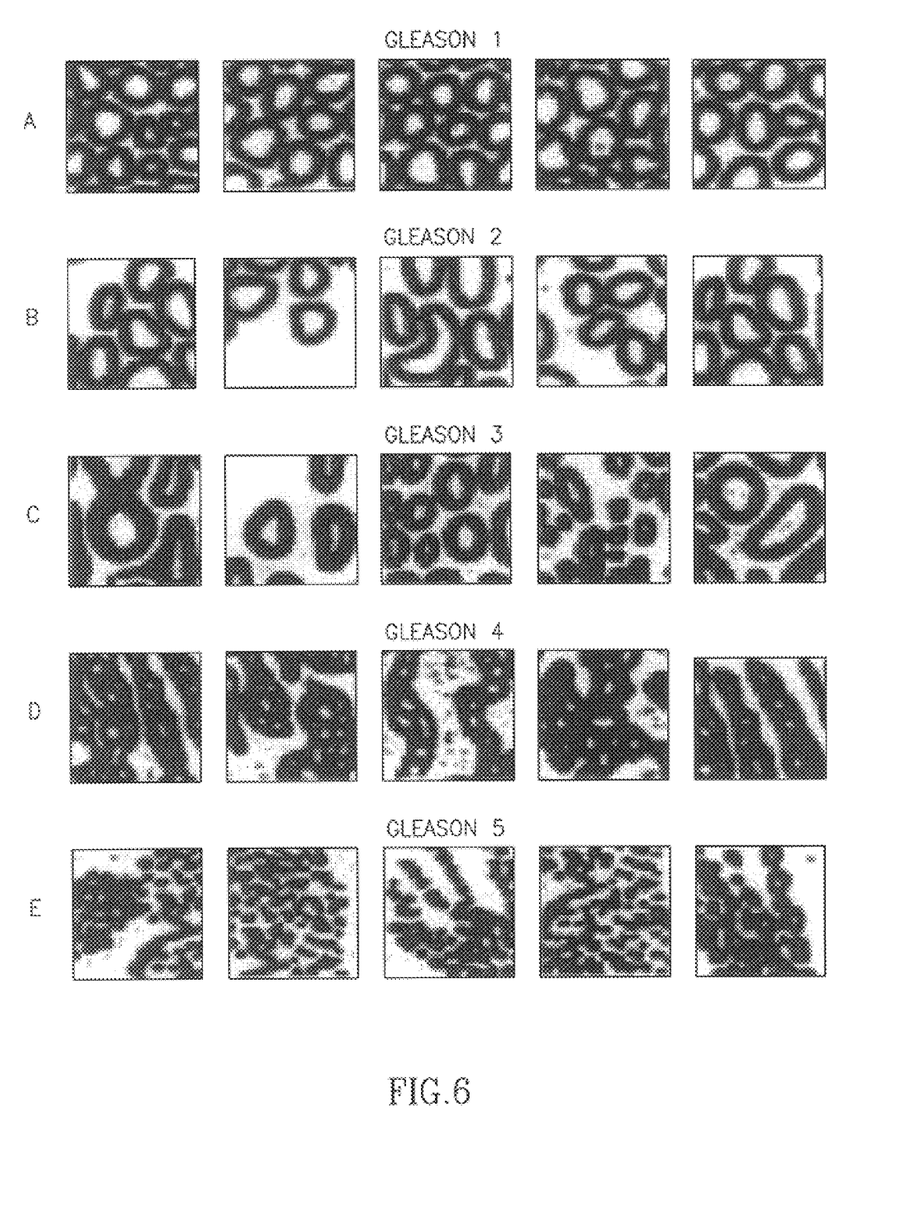
FIGS. 6a–e are images for evaluating and testing the method of the present invention on hand drawn schematic models, respectively representing Gleason Grades 1–5.

In FIG. 2 there is shown a block diagram of a preferred embodiment of a hardware system 30 implementation of the present invention. The system 30 comprises an image acquisition device 32 for acquiring and digitizing the medical image to be classified. In pathology applications device 32 comprises a pathological slide of a tissue mounted on a microscope, and a video camera (e.g., Sony 3CCD) attached to the microscope (e.g., Zeiss type), which provides the video image to a frame grabber in a pre-processor computer 34. Preprocessor computer 34 operates on the video images to provide alignment, scaling, gray-scale conversion and Fourier transformation before they are sent to the server computer 36 where they are classified These preprocessor steps are standard for processing image information, and are within the skill of the art. The server computer 36 operates in accordance with the algorithm of the inventive method (FIG. 1), and performs the similarity measurement on the incoming medical image using the pre-classified images stored in its library 38. The similarity distance measurements together with the classifying results are output to display device 40, typically for use by a doctor in diagnostic decision-making.

Server computer 36 is designed for implementation in a client-server architecture, connected to a communications system via connection 39. This connection may be for use with the Internet or any other clients in a network architecture, providing for access by test images sent from worldwide remote locations, and allowing for diagnostic results to be displayed on the client system, wherever located. This also enables dynamic growth of the library 38 based on addition of classified images received from remote locations.

In FIGS. 3–6 and Tables 1–4 the method of the present invention has been applied to the problem of the evaluation of prostatic cancer, by way of example. Numerous grading systems exist of which the Gleason method of histologic grading has a particular importance because of its widespread use in many institutions as well as in much of the literature. The Gleason system is based on the glandular pattern of the tumor as identified at relatively low magnification. Cytological features play no role in the grade of the tumor. Because it is based solely on architecture, there exists a simplified schematic illustration of the Gleason grading system that can be readily referred to when first addressing the task of diagnosing prostatic cancer.

In the normal prostate every gland is made of a circular row of cells which form the lining of a central space (the lumen). Each gland is surrounded by fibro-muscular tissue that keeps the gland units apart.

The Gleason classification patterns can be briefly described as follows:

Grade 1—Uniform, single, separate, closely packed glands forming the tumor mass.

Grade 2—A less uniform and more loose arrangement of the neoplastic glands with greater variation in size and shape as compared to grade 1.

Grade 3—Discrete gland formation of smaller average diameter than seen in grades 1 and 2. Increased variation in size and shape of the neoplastic glands as well as the emergence of an infiltrative pattern, i.e., the tumor is paving its way between normal glands.

Grade 4—Loss of glandular differentiation with only minimal lumen formation.

Grade 5—No glandular differentiation. A mass of either solid sheets, cords, or single cells.

The determination of the different grades requires an experienced pathologist, so it is challenging, once the classification is accomplished, to try and classify these tumors based on similarity criteria.

For the purpose of this study, a series of 5 micron thick, hematoxylin and eosin stained sections of human prostate tissue containing cancer foci were previewed to localize the tumor. An immuno stain for keratin (a protein present solely in epithelial cells) was employed to enhance the relevant glandular structures, since the method of the present invention is based on architectural features. All samples were photographed in Black and White using the same optical magnification (×10). A library of images was formed on a CD-ROM Using Kodak Photo-CD (digitizing 35 mm film to 4.5 Mb gray-level images). For each Gleason level [1 to 5] an experienced pathologist selected 10 representative 64×64 pixels gray-level images.

In FIGS. 3a–d, a set composed of 4 groups of microscopic sections was constructed. FIGS. 3a–c represent Gleason Grades 1–3, respectively. Grades 4 and 5 were combined into one group in FIG. 3d, since the limitation of a unified low magnification tends to make them look similar. Each group had 10 images 64×64 pixels in size.

In FIGS. 4a, the images of every group in FIGS. 3a–d were Fourier transformed and averaged. The Karhunen-Loe've expansion was then carried out to produce the eigenvectors and eigenimages that describe the image space of each group within the set.

FIGS. 5a–d show the first 3 eigenimages of each Gleason grade represented in FIGS. 1 and 2. The projection of every image to the eigenvector set of each group was then calculated, and the weights obtained used to reconstruct the image with the set's eigenvectors. The shortest RMS distance from the original image was used to classify the image. Since a group had 10 images, every image was tested by projection on the eigenvector space formed by the other 9 images in its group, and then those formed by the 9 images of every other group. A set of 20 additional microscopic sections (5 for each group) was used to test classification based on the eigenvectors obtained from the first set. The RMS distance of the images in each group was calculated by repeating steps 20 to 28 of the method described in FIG. 1 above.

Table 1 gives the results of the similarity method applied to 36 prostate microscopic slides. The images are subdivided into 4 blocks of 9 images each. Each block represents a different level of cancer severity according to the Gleason Grading system. As in FIGS. 3–5, the levels are Gleason Grade 1, Gleason Grade 2, Gleason Grade 3 and Gleason Grade 4 and 5 (combined). Block 1 represents the classification results of the 9 images that were preclassified as severity level of Gleason Grade 1. Each one of the 9 columns (1 column per image) in block 1 consists of 4 rows. Each row represents the similarity distance of the image in the column to the images preclassified as Gleason Grade 1 in row 1, Gleason Grade 2 in row 2, Gleason Grade 3 in row 3 and Gleason Grade 4 and 5 in row 4. In block 1 the lowest numbers are in row 1 since the 9 images that are being tested were preclassified as Gleason Grade 1. Block 2 represents the classification results of the 9 images that were preclassified as Gleason Grade 2. Thus in block 2 the lowest numbers should be in row 2. The same applies to blocks 3 and 4.

Ideally, in every block the correct row would have the lowest values and the other rows (representing the other Gleason Grades) would have values which are as high as possible. This depends on the classification set and improves as the size of the preclassified set increases. As shown, the method correctly classified 35 out of 36 (97.2%) images in the set, the only miss being in group 2 image 6. The lowest RMS distance value of the missed classification puts it in group 1. This value, however, was only minimally different form the respective value in the correct (second) group. The misclassification may be explained by subtle deviation from the characteristic histology of the group to which the image was assigned, a deviation that was spotted by the method but missed by the pathologist.

Referring now to FIGS. 6a–c, there are shown images for evaluating and testing the method of the present invention on hand drawn schematic models. Schematic prostate drawings found in a typical pathology book were scanned. The images were subdivided into 5 blocks (FIGS. 6a–c) of 9 images. Each block represents a different level of cancer severity (Gleason Grade 1–5, respectively).

Tables 2A–2B give the result of the similarity method of the present invention applied to 45 scanned schematic drawings. The method correctly classified 41 out of 45 (88.6%) images in this set. The 4 misclassified images were always positioned by the method in a group close in similarity to the correct classification. These misclassifications may be due to the fact that the schematic images are not as well differentiated from each other as those in the microscopic set.

Table 3 shows different quality variations of the $RMS_{13}$ ERROR Average distances from the correct classification of the other groups were calculated. A higher distance value shows a better distinction between the groups. In the first column eigenvectors were used. In the second column, the Fourier central component (the largest value, relevant only to the DC value of the image) was zeroed and a significant improvement was achieved, as was theoretically expected. In the third and fourth column 5 and 3 eigenvectors, respectively, were used of the full 9 available. As the results show, it is possible to work with a small subset of the more significant eigenvectors (since the eigenvalues are used to sort them by magnitude), thus increasing efficiency and enhancing performance.

Table 4 shows the results of classifying 20 new images, based on the eigenvectors calculated for the first set. There are 5 images in each group. From the 20 images 18 were correctly classified (90%). As can be seen, the 2 errors occurred between Gleason Grades 1 and 2, and are a result of the low similarity distance between these groups.

The correct classification of 35 out of 36 (97.2%) in the microscopic sections set (Table 1), and 41 out of 45 (88.6%) in the schematic set (Table 2), shows the strength of the method. These results were achieved on relatively small sets of images (40 and 50 images, respectively), and larger groups would yield better results, as the probability of having more similar images in a group increases, thus reducing the RMS_ERROR.

The results of the schematic group (FIG. 6, Tables 2A–B) illustrate a particularly useful feature of this method. Hand sketched illustrations of a classification problem (using a simple drawing package such as Microsoft Paintbrush) can be prepared, allowing pre-classification of the schematic images for immediate testing of the method, before employing it to an actual problem.

To compare accuracy with human performance the results obtained with the method of the present invention may be compared with a recent study by the Scottish Pathology Consistency Group. In the Scottish study, 12 pathologists diagnosed 100 needle biopsy specimens of prostate. The specimens were diagnosed as benign, suspicious or malignant and given a Gleason Grade for those regarded as malignant. A value called Kappa is used for measuring agreement. A value >0.7 is regarded as excellent, a level >0.4 is regarded as satisfactory, and 0 is no better than random. The kappa value for benign versus malignancy cases in the Scottish study was approximately 0.9. The kappa value for Gleason grading was around 0.45. The equivalent kappa value using the similarity method of the present invention is approximately 0.9.

Figure 7:
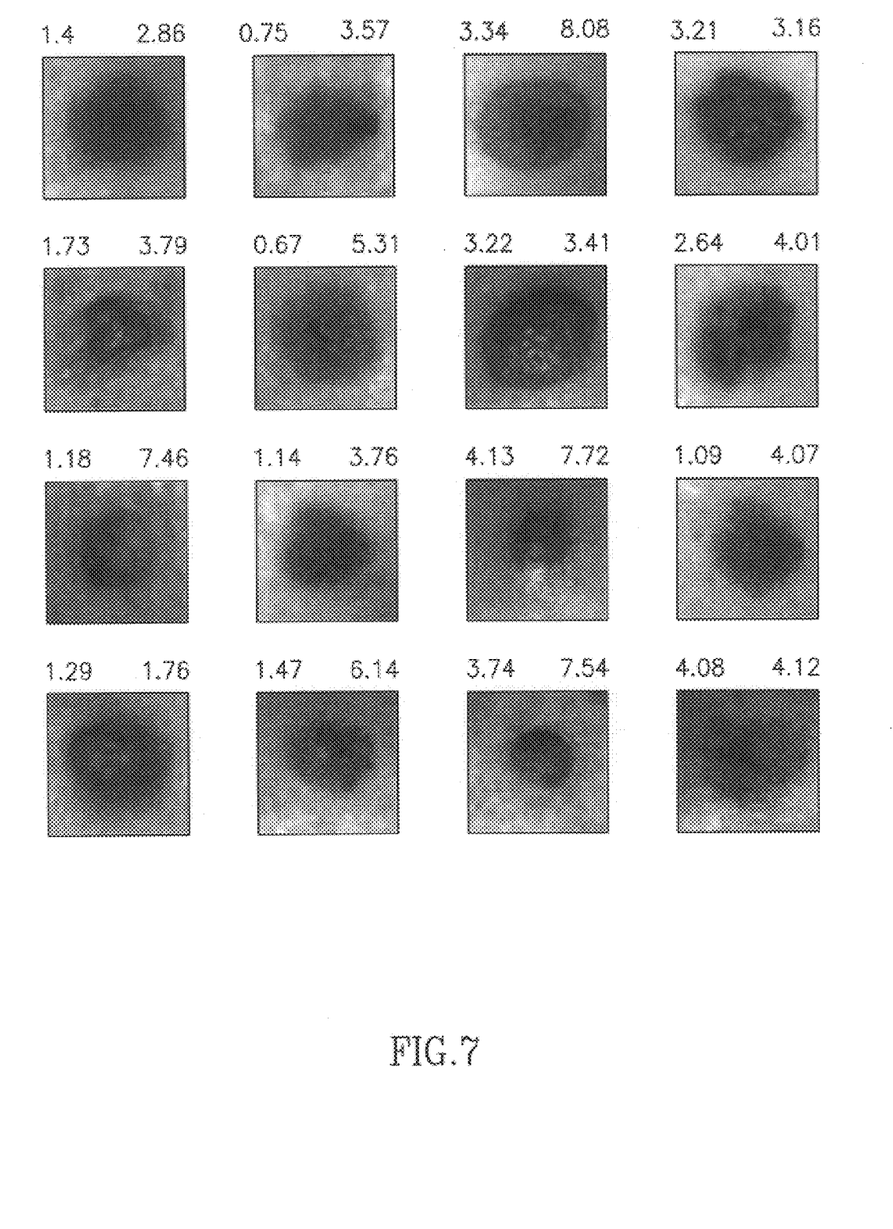
FIG. 7 shows a similarity distance measurement for 12 images from the dysplastic nevi set.
Figure 8:
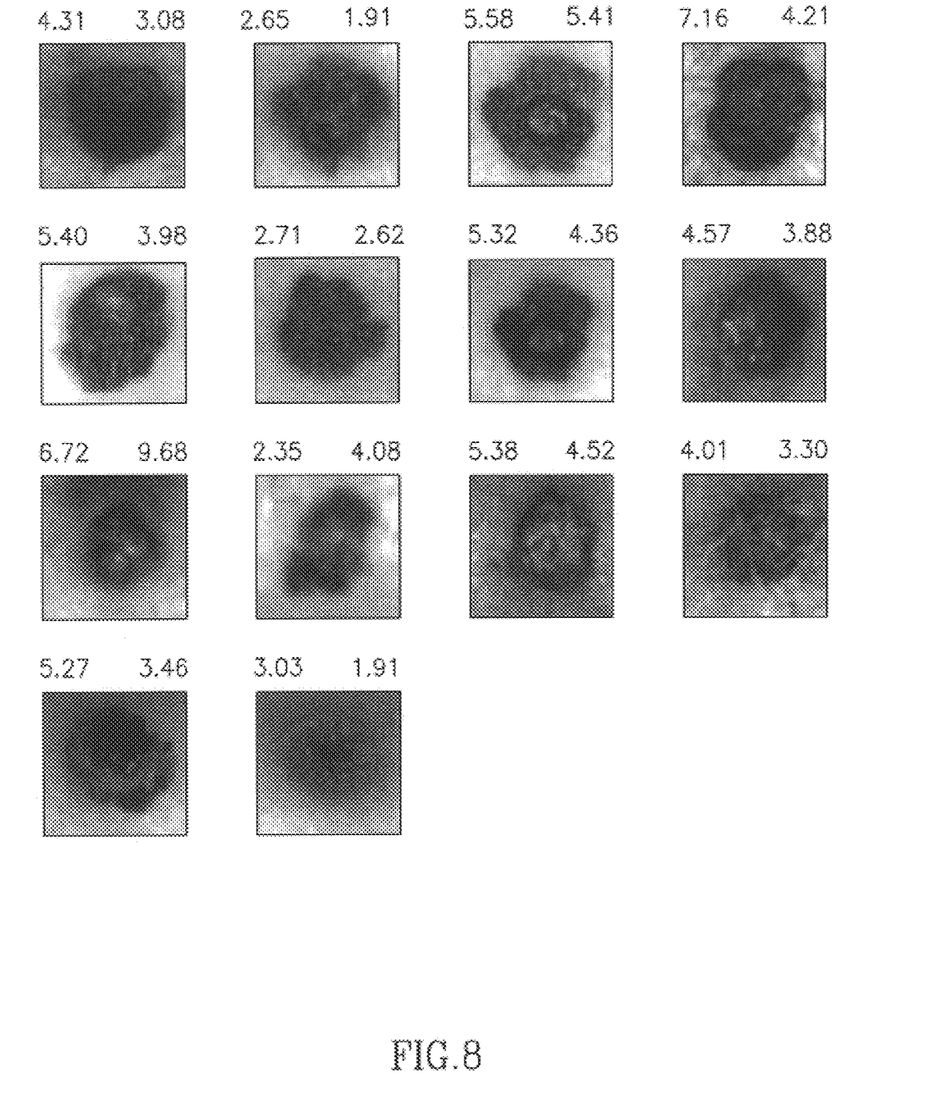
FIG. 8 shows a similarity distance measurement for 12 images from the malignant nevi set.

In FIGS. 7 and 8 and in Tables 5–7, the method of the present invention has been applied to the problem of melanoma screening, by way of example. In the United States, the ABCD checklist for detecting cutaneous melanomata is recommended as a means for distinguishing benign lesions from melanoma. The criteria making up the ABCD checklist are all physical examination features. Indications for melanoma include:

(1)(A-Asymmetry) if the lesion is bisected one half is not identical to the other half;
(2)(B-Border) when the border is uneven or ragged as opposed to smooth and straight, border irregularity;
(3)(C-Color) when more than 1 shade of pigment is present, color variegation; and
(4)(D-Diameter) when the diameter is greater than 6 mm.

The gold standard for the diagnosis of melanoma is the histopathological evaluation of excised tissue.

The semiological value of the ABCD criteria was studied on a group of 460 primary cutaneous melanomas and a control group of 680 randomly selected non-melanoma pigmented lesions. The criteria were recorded by trained dermatologists, over a period of 20 years prior to sending the specimen to a dermapathology laboratory.

Table 5 shows the arithmetic mean of all scores obtained in each pathology for every semiological criterion. A present criteria was rated as 1 and an absent as 0. Table 6 shows the arithmetic mean of the number of present criteria in every group of pigmented tumors. What is clearly evident from both Tables 5 and 6 is that it is not possible to discriminate between many atypical nevi and melanomas on the basis of the ABCD criteria. This based on the ABCD system, all atypical nevi must be removed for fear of missing a melanoma, resulting in a high sensitivity but a low specificity. From Table 7 another weakness of the ABCD criteria is shown: high scores of sensitivity come at the expense of lower scores of specificity and vice versa. If only one criterion is required to be present nearly all the melanomas (97.3%) are detected, but ⅔ false-positives are found. The method of the present invention enables two of the shortcomings of the ABCD criteria to be overcome:

1) An objective criteria for mass detection of melanoma with high scores of both sensitivity and especially specificity.
2) A way to discriminate between atypical nevi and melanomas.

As in the case of prostatic cancer, the outcome of the screening is based on the nevus image being interpreted in the physician's mind. The judgement is based on a comparison to images previously learned by the individual and stored in his memory, in addition to a s of rules he was taught to apply (ABCP). The fact that hundreds or thousands of images of nevi that were surgically removed and histopathologically diagnosed exist, is ignored. A huge record of valid experience is not being consulted.

Referring now to FIGS. 7 and 8, color slides of nevi that were removed and histopathologically diagnosed over the last 5 years, were collected from the Plastic Surgery Department archives at the Hadassah hospital, Ein Kerem Jerusalem, Israel. All slides were color scanned (using a scanner such as Umax Astra 1220s) using 600 dpi, into a standard image editor (Photo-Shop). The editor was used to center the nevi in the image in a square, resize it to a 64×64 size and convert it to grayscale. Those images were split into 2 sets, benign and melanoma (FIGS. 7 and 8, respectively), for classification by the similarity method.

The computer was used to find mathematical features of the two groups, something a medical practitioner would have difficulty doing on his own. To find the features that most effectively describe each image set the vectors (eigenvectors) that describe the variation from the prototype (average) image of the set are calculated (Karhunen-Loe've Transform). These eigenvectors together characterize all of the variations between images of the set and the prototype. The eigenvectors are equivalent to the Red, Green and Blue base vectors used to describe the entire color space. The eigenvectors of each set (9 in each) are used to try and reconstruct the screened image. The one providing the smallest distance from the original is the classification. The size of the distance indicates the classification quality.

In FIG. 7 there are shown dysplastic nevi. The left value shows the image distance from the dysplastic set. The right value shows the image distance from the malignant set. In this case the value shown on the left should be smaller that the value shown on the right. In FIG. 8 there are shown malignant nevi. The left value shows the image distance from the dysplastic set. The right value shows the image distance from the malignant set. In this case the value shown on the right should be smaller than the value shown on the left. From the cases selected to demonstrate the method 90% (54 out of 60) of the nevi were correctly diagnosed. From the dysplastic group (FIG. 7), 30 out of 32 were correctly diagnosed—a specificity of 93.75%. From the malignant group (FIG. 8), 24 out of 28 nevi were correctly diagnosed—a sensitivity of 86%. The similarity distance value also shows those images that are on the borderline between the 2 groups (FIG. 7—images 4 and 7, FIG. 8—images 3 and 6). Since malignancy is a process of uncontrolled growth, it will result in a bigger variability of the images in this group, compared to the dysplastic group. Thus, inherent in the method is high specificity resulting from the more common features benign nevi share, this addresses the fact that roughly 99% of the nevi screened are benign. The two errors in the malignant group (FIG. 8, image 9 and 10) occurred in images of different architecture than the others in the group. To improve on the burden resulting from bigger variability in the malignant group, images can be arranged into subgroups (centered, spread images etc.).

It should be noted that the images used in the above-described example of melanoma screening were taken over the years without any standardization. Building a library of images acquired with standard lighting, distance and resolution will improve the performance even more. This approach effectively creates a dynamically growing image library. As the size of the library increases, the odds of a similar image appearing in one of the groups increases which would significantly reduce the similarity distance value of that group, compared to the other, making the distinction between the two, much clearer.

Having described the invention with regard to certain specific embodiments thereof, it is to be understood that the description is not meant as a limitation since further modifications will now become apparent to those skilled in the art, and it is intended to cover such modifications as fall within the scope of the appended claims.

I claim:

1. A similarity measurement method for the classification of medical images into predetermined categories, said method comprising the steps of:

provide a pre-classified library of images divided into at least two subgroups, each of said subgroups having a medical diagnostic meaning;

mathematically deriving a basic set of eigenvectors having coefficients that describe each of said subgroups, where each image in said subgroup is represented as a weighted linear combination of said basic set of eigenvector coefficients;

providing a test image;

projecting said test image onto said basic set of eigenvectors associated with each of said subgroups, to obtain a set of projection coefficients of said test image for each of said subgroups;

reconstructing, for each of said subgroups, said test image with said set of projection coefficients and said basic set of eigenvectors;

measuring the RMS (root-mean-square) distance between said reconstructed test image in each of said subgroups and said test image, said measured distance representing similarity;

selecting, from among said similarity measurement distances, the smallest similarity measurement distance; and classifying said test image in accordance with said selected smallest similarity measurement distance.

2. The method of claim 1 wherein said selecting step comprises the steps of:

comparing eh of said similarity measurement distances with a predetermined threshold value; and rejecting said test image if said threshold value is exceeded, thereby preserving the integrity of said library of images.

3. The method of claim 1 further comprising the step of adding said classified test image to said library of images.

4. The method of claim 3 wherein repeated performance of said step of adding said classified test image increases the probability of matching an existing image in said library with said test image.

5. The method of claim 1 wherein said library image providing step is performed by a communications system.

6. The method of claim 1 wherein said test image providing step is performed by a communications system.

7. The method of claim 6 wherein said communications system has a client-server architecture, wherein said pre-classified library of images is contained on the server and said method steps are performed in an algorithm which runs on a computer located at the server locations and said test image is provided by the client.

8. The method of claim 7 wherein said projecting, reconstructing, measuring, selecting and classifying steps are all performed automatically in an automatic diagnostic system, thereby saving medical diagnostic time.

9. The method of claim 1 wherein said projecting, reconstructing, measuring, selecting and classifying steps are all performed automatically in an automatic diagnostic system, thereby saving medical diagnostic time.

10. The method of claim 1 applied to diagnostic testing, wherein repeated performance of said step of adding said classified test image increases the accuracy of a diagnostic test performed in accordance with said method.

11. The method of claim 10 wherein said diagnostic test is for adenocarcinomas.

12. The method of claim 10 wherein said diagnostic test is based on brain PET scans for classification of psychiatric mental states.

13. The method of claim 10 wherein said diagnostic test is for predicting bone osteoporosis.

14. The method of claim 10 wherein said diagnostic test is for thallium images in cardiology.

15. The method of claim 10 wherein said diagnostic test is for use in spine surgery for predicting surgical results of spine curvature surgery.

16. The method of claim 1 wherein said test images are hand sketched illustrations provided for pre-classification for immediate testing of said method, before employing it to an actual problem.

17. A similarity measurement system for the classification of medical images into predetermined categories, said system comprising:

a pre-classified library of images divided into at least two subgroups, each of said subgroups having a medical diagnostic meaning;

means for mathematically deriving a basic set of eigenvectors having coefficients that describe each of said subgroups, where each image in said subgroup is represented as a weighted linear combination of said basic set of eigenvector coefficients;

image acquisition means for providing a test image;

means for projecting said test image onto said basic set of eigenvectors associated with each of said subgroups, to obtain a set of projection coefficients of said test image for each of said subgroups;

means for reconstructing, for each of said subgroups, said test image with said set of projection coefficients and said basic set of eigenvectors;

means for measuring the RMS (root-mean-square) distance between said reconstructed test image in each of said subgroups and said test image, said measured distance representing similarity;

means for selecting, from among said similarity measurement distances, the smallest similarity measurement distance; and means for classifying said test image in accordance with said selected smallest similarity measurement distance; and means for displaying said test image classification for diagnostic purposes.

18. The system of claim 17 wherein said library of images is stored in a computer.

19. The system of claim 17 wherein said stored library of images is arranged for dynamic growth based on addition of new test images after classification.

20. The system of claim 17 wherein said mathematical derivation means, said projecting means, said reconstructing means, said measuring means, said selecting means, and said classifying means are all implemented in a computer.

* * * * *